United States Patent
Mills et al.

(10) Patent No.: US 7,337,193 B1
(45) Date of Patent: Feb. 26, 2008

(54) DETERMINING PRIORITY BETWEEN DATA ITEMS

(75) Inventors: William L. Mills, Yacolt, WA (US); Alvin I. Pivowar, Camas, WA (US)

(73) Assignee: PalmSource, Inc., Sunnyvale, CA (US)

( * ) Notice: Subject to any disclaimer, the term of this patent is extended or adjusted under 35 U.S.C. 154(b) by 49 days.

(21) Appl. No.: 10/159,461

(22) Filed: May 31, 2002

Related U.S. Application Data

(60) Provisional application No. 60/377,713, filed on May 2, 2002.

(51) Int. Cl.
*G06F 17/30* (2006.01)
*G06F 15/16* (2006.01)

(52) U.S. Cl. .................. 707/200; 707/201; 707/203; 715/503

(58) Field of Classification Search ............... 375/354; 707/1, 8, 200, 201, 203; 715/503; 711/112
See application file for complete search history.

(56) References Cited

U.S. PATENT DOCUMENTS

| | | | |
|---|---|---|---|
| 6,330,568 B1* | 12/2001 | Boothby et al. | 707/201 |
| 6,343,299 B1* | 1/2002 | Huang et al. | 707/203 |
| 6,449,622 B1* | 9/2002 | LaRue et al. | 707/201 |
| 6,493,725 B1* | 12/2002 | Iwai et al. | 707/201 |
| 6,532,480 B1* | 3/2003 | Boothby | 707/201 |
| 2001/0001870 A1* | 5/2001 | Ofek et al. | 711/112 |
| 2001/0048728 A1* | 12/2001 | Peng | 375/354 |
| 2002/0069220 A1* | 6/2002 | Tran | 707/503 |
| 2002/0129007 A1* | 9/2002 | Kobayashi et al. | 707/1 |
| 2002/0161735 A1* | 10/2002 | Cheng et al. | 707/1 |
| 2003/0097381 A1* | 5/2003 | Detweiler et al. | 707/201 |
| 2004/0078370 A1* | 4/2004 | Acree et al. | 707/8 |

* cited by examiner

*Primary Examiner*—Jeffrey Gaffin
*Assistant Examiner*—Hassan "Tony" Mahmoudi
(74) *Attorney, Agent, or Firm*—Berry & Associates P.C.

(57) ABSTRACT

One embodiment of the present invention enables nodes or endpoints involved with synchronization of data items to determine which version of a data item (if any) has priority over another version of that same data item. Within the present embodiment, when a data item is modified by a node, it is presumed that the modified data item takes priority over the previous version of that data item. Therefore, the "descendant" data item (modified) takes precedence over its "ancestor" data item (previous version). By including this type of "pedigree" information with data items involved with synchronization between different nodes or endpoints, the present embodiment enables the endpoints to determine which version of a data item (if any) has priority over another version of that same data item.

20 Claims, 6 Drawing Sheets

DETERMINING PRIORITY BETWEEN DATA ITEMS

CROSS REFERENCE TO RELATED APPLICATIONS

This application claims priority to the copending Provisional Patent Application No. 60/377,713, entitled "System and Method for Synchronizing Computer Databases," filed May 2, 2002, and assigned to the assignee of the present application.

TECHNICAL FIELD

The present invention relates generally to the field of databases. Specifically, the present invention relates to the field of synchronizing data between multiple nodes.

BACKGROUND ART

In the realm of handheld computer systems (commonly referred to as personal digital assistants or PDAs), it is not uncommon for a data set to exist and be maintained both on the PDA and on at least one other computing device. For example, a user may maintain a calendar or address book on both his or her PDA and on another computer system (e.g., a personal computer system such as a desktop or laptop).

The entries in the data set can be referred to as records or data objects. When a change is made to a record in the data set residing on one device (hereinafter, also referred to as a node), it is desirable to have the data set on the other node be updated as well, so that the data set is synchronized on both nodes. Accordingly, processes have been developed to facilitate synchronizing the data sets on both nodes. These synchronization ("sync") processes are known in the art.

Currently, each record in a data set may be identified by a unique record identifier (record ID). To prevent duplication of record IDs, the task of assigning IDs to records is relegated to the PDA.

Generally, synchronization is performed using either a "slow sync" technique or a "fast sync" technique. Using a slow sync, all of the records are transferred between nodes; the data set on one node is transferred to the other. The records in each data set are then compared in order to determine which records have changed since the last sync, and the respective data sets are updated accordingly.

Fast syncs are accommodated by tagging records when they are modified. Typically, a bit associated with each record is set to one value or another to indicate whether or not that record has been changed since the last sync; the bits that have been set are often referred to as "dirty" bits. Using a fast sync, only the changes made to the data set on each node since the last sync are transferred to the other node. After the fast sync is performed, the dirty bits are cleared.

Although fast syncs are preferred, there are occasions when slow syncs need to be performed. For instance, it is becoming more common for people to use more than one computer system. Many people use a computer system at home and another one at work, for example. If a user performs a fast sync between the PDA and one of the computer systems, the dirty bits would be cleared. Consequently, the records on the PDA that have changed cannot be identified using the dirty bits. Therefore, a subsequent sync between the PDA and another computer system will use a slow sync to identify changes made to the records since the last time these latter two nodes had been synched.

Thus, one problem with the common synchronization techniques is that slow syncs are occurring more frequently as a growing number of people interact with multiple computer systems with their PDA. Slow syncs take longer to complete than fast syncs, and so they are less desirable. Also, the time needed to complete slow syncs is increasing as memory sizes increase for PDAs.

Another issue with typical synchronization techniques is that they are limited with respect to the different types of syncs that can now occur. Traditionally, synchronization occurs between a PDA and one or more personal computer systems as described above. However, the paradigm in which the PDA serves in essence as the nexus between the user's home and office computer systems is not as applicable as it once was. As computer systems are networked, multiple communication pathways between PDAs and computer systems can exist, and synchronization between multiple devices needs to be supported. The notion of a single source (e.g., the PDA) for record IDs is not as workable as before.

Also, records are frequently shared between users and quite often are distributed and stored across many nodes. Some records may be accessible by multiple users working from different nodes. In any event, different users may update a record in different ways, and the modified record may be distributed over different pathways. Along the way, the record may be further modified. As a result, different versions of the same record may reach a node, causing a conflict to arise as to which version of the record should take precedence over another. Using contemporary synchronization techniques, these records are unnecessarily replicated at the destination node, slowing down syncs while consuming memory. User intervention is then usually required to glean which records are correct and which can be discarded.

SUMMARY OF THE INVENTION

Accordingly, given that different versions of the same record may reach a node, a need exists for a method and/or system that enables the node to more easily determine which version of the record (if any) takes precedence over the others. The present invention provides one or more embodiments which accomplish the above mentioned need.

Specifically, one embodiment of the present invention enables nodes or endpoints involved with synchronization of data items to determine which version of a data item (if any) has priority over another version of that same data item. Within the present embodiment, when a data item is modified by a node, it is presumed that the modified data item takes priority over the previous version of that data item. Therefore, the "descendant" data item (modified) takes precedence over its "ancestor" data item (previous version). By including this type of "pedigree" information with data items involved with synchronization between different nodes or endpoints, the present embodiment enables the endpoints to determine which version of a data item (if any) has priority over another version of that same data item.

In another embodiment, the present invention provides a method for determining priority between two data items during a synchronization process between two nodes. The method includes determining if any data items have matching identities during the synchronization process. Furthermore, the method includes determining if the content of a first and second data items are unequal, in response to the first and second data items having matching identities. Additionally, the method includes determining whether the first data item descended from the second data item, in response to the content of the first and second data items being unequal. The method also includes determining that the first data item has priority over the second data item, in response to the first data item descending from the second data item.

In yet another embodiment, the present invention includes a computer implemented method for determining priority between two data items during a synchronization process between two nodes. The computer implemented method includes determining whether a first and second data items have matching identities during the synchronization process. Additionally, the computer implemented method includes determining if the content of the first and second data items are unequal. The computer implemented method also includes determining whether the first data item descended from the second data item, in response to the first and second data items having matching identity and the content of the first and second data items being unequal. Moreover, the computer implemented method includes determining that the first data item has priority over the second data item, in response to the first data item descending from the second data item.

In still another embodiment, the present invention includes a computer-usable medium having computer-readable code embodied therein for causing a computing device to perform particular operations. The computer-usable medium causes the computing device to perform: deciding if a first and second data items have matching identities during a synchronization process between two nodes; deciding if the content of the first and second data items are unequal; deciding if the first data item descended from the second data item, in response to the first and second data items having matching identities and the content of the first and second data items being unequal; and deciding that the first data item has priority over the second data item, in response to the first data item descending from the second data item.

The present invention provides these advantages and others which will no doubt become obvious to those of ordinary skill in the art after having read the following detailed description of embodiments in accordance with the present invention.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE INVENTION

Figure 1A:
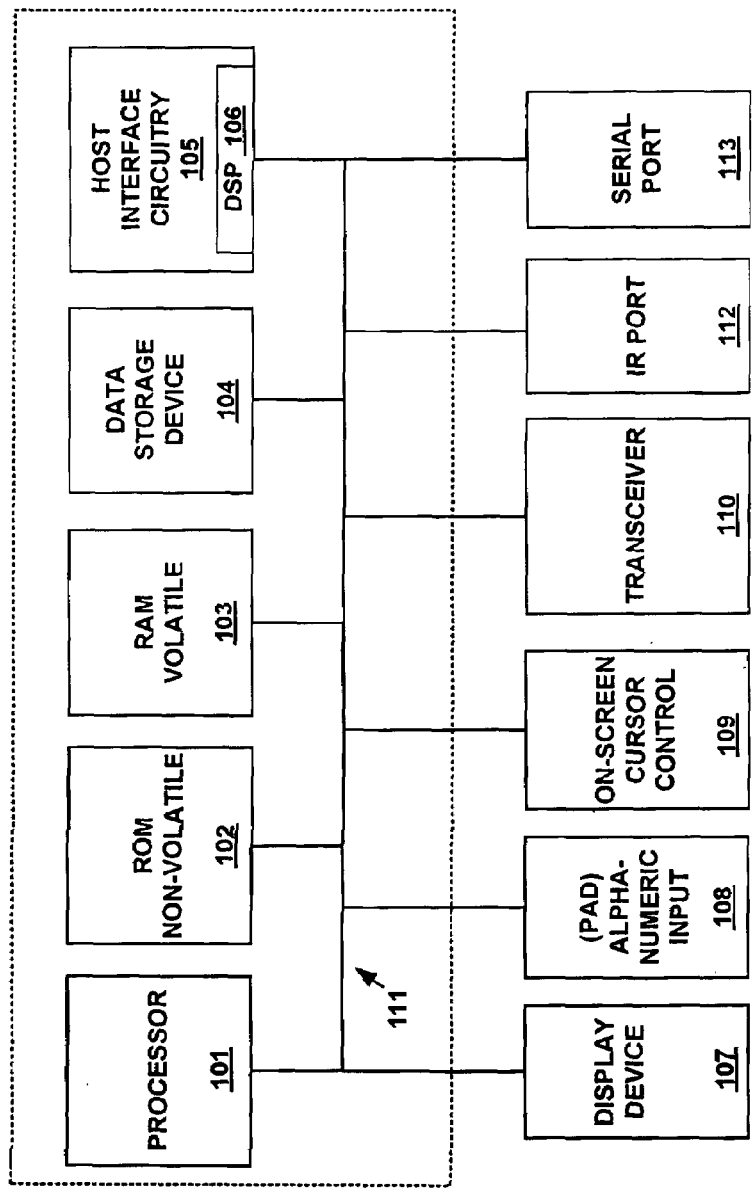
FIG. 1A is a block diagram of an exemplary handheld computer system upon which embodiments of the present invention may be practiced.

Reference will now be made in detail to embodiments of the invention, examples of which are illustrated in the accompanying drawings. While the invention will be described in conjunction with embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Notation and Nomenclature

Some portions of the detailed descriptions which follow are presented in terms of procedures, logic blocks, processing, and other symbolic representations of operations on data bits within a computing system or digital system memory. These descriptions and representations are the means used by those skilled in the data processing arts to most effectively convey the substance of their work to others skilled in the art. A procedure, logic block, process, etc., is herein, and generally, conceived to be a self-consistent sequence of steps or instructions leading to a desired result. The steps are those requiring physical manipulations of physical quantities. Usually, though not necessarily, these physical manipulations take the form of electrical or magnetic signals capable of being stored, transferred, combined, compared, and otherwise manipulated in a computing system or similar electronic computing device. For reasons of convenience, and with reference to common usage, these signals are referred to as bits, values, elements, symbols, characters, terms, numbers, or the like with reference to the present invention.

It should be borne in mind, however, that all of these terms are to be interpreted as referencing physical manipulations and quantities and are merely convenient labels and are to be interpreted further in view of terms commonly used in the art. Unless specifically stated otherwise as apparent from the following discussions, it is understood that throughout discussions of the present invention, discussions utilizing terms such as "advancing" or "determining" or "deciding" or "synchronizing" or "incrementing" or "deleting" or "transmitting" or "receiving" or "modifying" or "generating" or "utilizing" or "storing" or the like, refer to the action and processes of a computing system, or similar electronic computing device, that manipulates and transforms data. The data is represented as physical (electronic) quantities within the computing system's registers and memories and is transformed into other data similarly represented as physical quantities within the computing system's memories or registers or other such information storage, transmission, or display devices.

Exemplary Implementation Platforms

FIG. 1A is a block diagram of an embodiment of a device 100 upon which embodiments of the present invention may be implemented. In one embodiment, device 100 is a handheld computer system often referred to as a personal digital assistant (PDA) or a portable information device (PID). In its various implementations, device 100 may not include all of the elements illustrated by FIG. 1A, or device 100 may include other elements not shown by FIG. 1A.

In one embodiment, device 100 includes an address/data bus 111 for communicating information, a central processor 101 coupled with the bus 111 for processing information and instructions, a volatile memory 103 (e.g., random access memory, RAM) coupled with the bus 111 for storing information and instructions for the central processor 101, and a non-volatile memory 102 (e.g., read only memory, ROM) coupled with the bus 111 for storing static information and instructions for the processor 101. In the present embodiment, device 100 also includes an optional data storage device 104 (e.g., a Secure Digital card, a Multi Media Card, or the like) coupled with the bus 111 for storing information and instructions. Device 104 can be removable. In one embodiment, device 100 also contains a display device 107 coupled to the bus 111 for displaying information to a user.

In the present embodiment of FIG. 1A, device 100 also includes a signal transmitter/receiver (transceiver) device 110, which is coupled to bus 111 for providing a wireless radio (RF) communication link between device 100 and other wireless devices. It is understood that transceiver 110 may be coupled to device 100 or integral with device 100.

In one embodiment, device 100 includes host interface circuitry 105 coupled to bus 111. Host interface circuitry 105 includes an optional digital signal processor (DSP) 106 for processing data to be transmitted or data that are received via transceiver 110. Alternatively, processor 101 can perform some or all of the functions performed by DSP 106. In one embodiment, host interface circuitry 105 comprises a universal asynchronous receiver-transmitter (UART) module that provides the receiving and transmitting circuits utilized for serial communication for both the serial port 113 and the infrared (IR) port 112.

In one embodiment, device 100 of FIG. 1A also includes an optional alphanumeric input device 108 that, in one implementation, is a handwriting recognition pad ("digitizer"). Alphanumeric input device 108 can communicate information and command selections to processor 101 via bus 111. In one embodiment, device 100 also includes an optional cursor control or directing device (on-screen cursor control 109) coupled to bus 111 for communicating user input information and command selections to processor 101. In one implementation, on-screen cursor control device 109 is a touch screen device incorporated with display device 107.

Figure 1B:
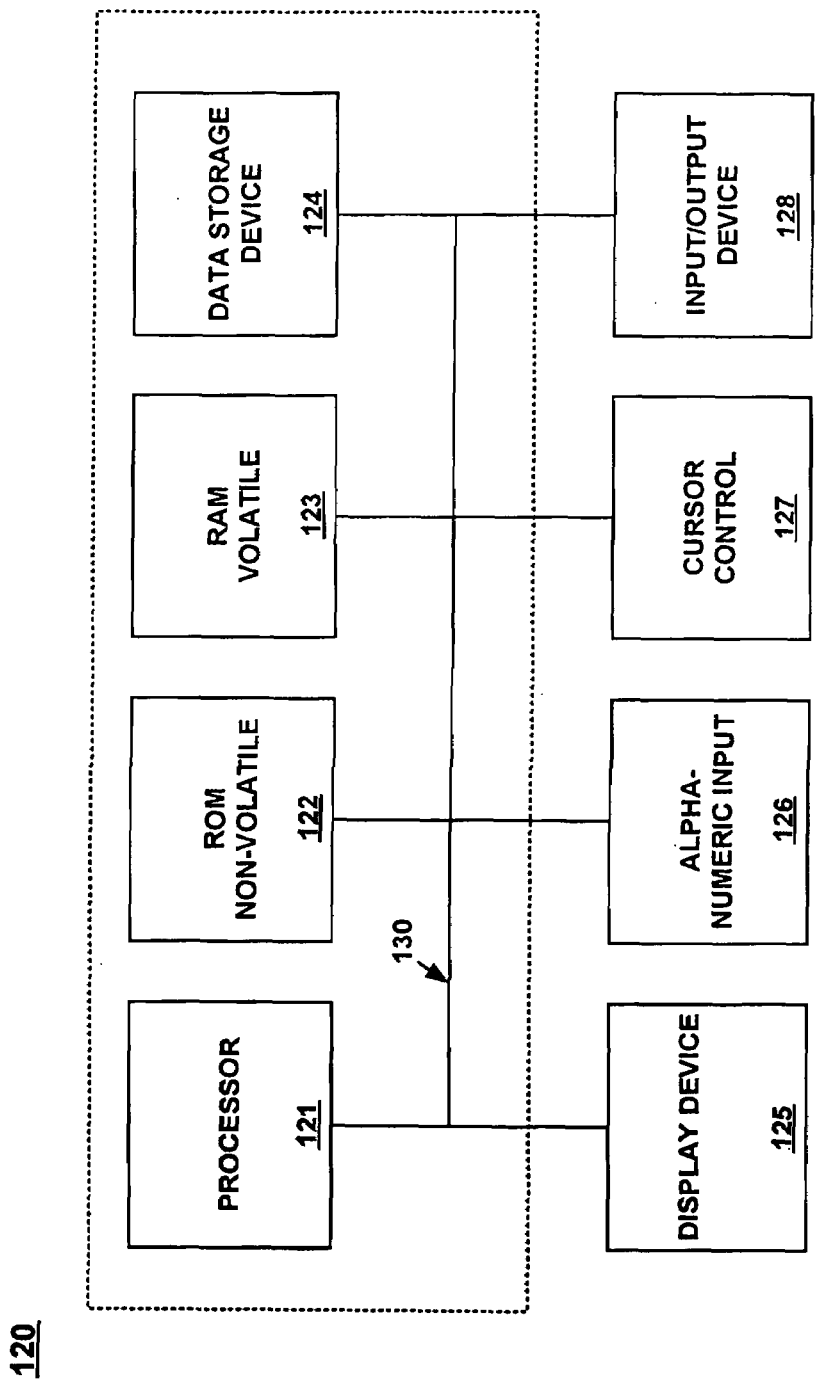
FIG. 1B is a block diagram of an exemplary computer system upon which embodiments of the present invention may be practiced.

Refer now to FIG. 1B that illustrates an exemplary computer system 120 upon which embodiments of the present invention may be practiced. In its various implementations, system 120 may not include all of the elements illustrated by FIG. 1B, or system 120 may include other elements not shown by FIG. 1B.

In general, computer system 120 comprises bus 130 for communicating information, processor 121 coupled with bus 130 for processing information and instructions, volatile memory (e.g., RAM) 123 coupled with bus 130 for storing information and instructions for processor 121, non-volatile memory (e.g., ROM) 122 coupled with bus 130 for storing static information and instructions for processor 121, data storage device 124 such as a magnetic or optical disk and disk drive coupled with bus 130 for storing information and instructions, an optional user output device such as display device 125 coupled to bus 130 for displaying information to the computer user, an optional user input device such as alphanumeric input device 126 including alphanumeric and function keys coupled to bus 130 for communicating information and command selections to processor 121, and an optional user input device such as cursor control device 127 coupled to bus 130 for communicating user input information and command selections to processor 121. Furthermore, input/output (I/O) device 128 is used to communicatively couple computer system 120 to another device (e.g., device 100 of FIG. 1A). It is understood that I/O device 128 may be a device used for wired communication and/or for wireless communication.

Exemplary Operation in Accordance with the Present Invention

Synchronization is generally a process by which a plurality of copies of a database are maintained such that the information in all copies is the same, or synchronized. The copies need not be bit for bit identical. A synchronization process can accommodate different file structure, operating system and data media requirements. The copies are frequently on different computer systems, but it is sometimes desirable to maintain separate, synchronized databases on the same computer system. Synchronization allows, for example, additions, deletions and/or changes made to one copy of a database (also known as mutations), for example a copy on a handheld computer, to be reflected to all copies.

These database copies are generally known as "endpoints" (or "farpoints" or "nodes"). At other times, the term "node" may be used to describe an entity, for example a computer system, comprising multiple endpoints. An endpoint is generally a source or destination of records (individual data items) to be synchronized. For example, it is commonplace to synchronize a desktop calendar system database with a calendar database on a handheld computer. In this example, the calendar database on the desktop computer is an endpoint, and the handheld calendar database is another endpoint. Endpoints are generally data structures in permanent, or semi-permanent computer memory, such as battery powered RAM in a handheld computer or magnetic media within a desktop computer. However, endpoints may be temporary, for example, a buffer in a wireless data protocol stack.

The entries in a data set can be referred to as records, data objects, or data items. When a change is made to a record in the data set residing on one device or node such as handheld computer 100, it is desirable to have the same data set on another device or node such as computer system 120 be updated as well, so that the data set is synchronized on both nodes. Within an embodiment of the present invention, the first abstraction applied to this type of synchronization is to model the data flow. Each place that stores data, even if only transiently, is modeled as a node. Nodes that exchange data are coupled nodes. Handheld device 100 is a node. More specifically, its data store may be a node. A desktop viewer (such as Palm Desktop) with its data cache is a node. A data-sharing server is a node. A HotSync between Palm Desktop and a cradled handheld is a coupling edge between the two nodes.

It is noted that if a sync flow graph contains loops, then it is possible for a given piece of data to arrive at a node via two different pathways and with arbitrary timing. If the data from the two pathways differs, then the task of resolving the difference may potentially need more information about the sequence, timing, and locale of changes made to the data enroute.

Within an embodiment of the present embodiment, another abstraction applied to synchronization is to model the data as independent atoms. This abstraction leaves out the notions of data creation and destruction. It assumes the data already exists and is getting modified and passed along. A data atom may have two properties of interest. It has an identity and it has comparable content.

The identity property means that two data atoms can be examined and it can be determined that they represent either the same piece of data, or not. The content property means that two data atoms with matching identity can be further compared for content. Within an embodiment, the content is either equal, or it is not. It should be noted that a data atom may be, but is not limited to, a record or a field of a record. Since both may be identified and compared for content, either one may be a data atom.

When a data atom is modified, it may be referred to as a mutation. Copies may or may not get exchanged, perhaps unidirectionally, when nodes communicate. When a data atom is modified, the original may be referred to as the ancestor and the mutation is referred to as the descendant. The concept extends to multiple generations of mutations. Furthermore, a mutation is presumed desirable. That is, some user or some knowledgeable process changed the data intentionally with a fidelity expectation that the system would retain that change. Therefore, priority may be presumed for any mutation over any of its ancestors. This presumption may be referred to as the presumption of deliberateness.

When a node has two data atoms with equal identity but unequal content, that is referred to as a disparity. There may be two kinds of disparities. In an ordered disparity, one of the atoms is the ancestor of a descendant derived by one or more mutations from the ancestor. The presumption of deliberateness allows us to assign priority to the descendant.

The second kind of disparity is an unordered disparity. Neither data atom is the descendant of the other and may not be resolved via the presumption of deliberateness. An unresolved disparity, whether ordered or unordered, is a conflict. An ordered disparity may be resolved without violating fidelity expectations by removal of the ancestor and retention of the descendant. However, an unordered disparity may not be resolved without violating some previous fidelity expectation. Within an embodiment, unordered disparities may be resolvable by an external agent, who possess additional information. It should be understood that the external agent acts on the data to produce a mutation it favors, thus introducing the missing "deliberateness" needed to resolve a disparity. Functionally, sync resolves ordered disparities while detecting unordered disparities.

An embodiment of the present invention enables nodes or endpoints involved with synchronization of data items to determine which version of a data item or atom (if any) has priority over another version of that same data item. When a data item is modified by a node, it is presumed that the modified data item takes priority over the previous version of that data item or atom. Therefore, the "descendant" data item (modified) takes precedence over its "ancestor" data item (previous version). By including this type of "pedigree" information with data items involved with synchronization between different nodes or endpoints, the present embodiment enables determination as to which version of a data item (if any) has priority over another version(s) of that same data item.

Specifically, a "pedigree" is generally a change history of a data atom, and may be used to indicate if the data atom has changed since a synchronization session. Within the present embodiment, a "synchronization counter" or "sync counter" may be used to establish a pedigree of a data atom. It is noted that the sync counter may also be referred to as a "synchronization clock" or "sync clock." According to an embodiment of the present invention, a sync counter may be a positive integer value that increases monotonically with each synchronization action. It should be appreciated that the value of a synchronization counter need have no relation to actual time. A synchronization counter may be viewed as a label for a period of time between synchronizations.

Furthermore, a sync counter may be maintained for an individual database or node. Such individual sync counters may be useful when databases are synchronized within a computer device or when all databases are not synchronized at the same time. A single sync counter may also be maintained by and for a single computer system. A sync counter should be advanced at each synchronization (unless no changes have occurred since a prior synchronization). However, the sync counter may be advanced more frequently, for example at each synchronization or at each modification of a data atom. Alternatively, the sync counter may just be advanced when the first data atom is modified within a node after a sync.

Using sync counters, a pedigree may be created by combining the count of a sync counter and an identifier of a node, a database or a device. This information is then associated with a data atom when the data atom is created or modified. For example, a desk top computer (e.g., 120) may use the letter "D" as its identifier. When a database record, e.g., an appointment is created, the sync counter may have a value of "21." Consequently, the database record may be assigned a pedigree of "D21" to indicate that the record was created on the desk top computer "D" while the desk top computer's sync counter was 21.

As another example, assume that the desk top computer (e.g., 120) synchronizes with a handheld computer (e.g., 100), receiving a copy of the exemplary appointment data record during the process. A change to this record performed on handheld computer 100 may append handheld computer 100's identification and value of its current sync counter to previously included pedigree information. Thus, the pedigree for the now modified data record may be "D21H43," where the "H43" portion represents an identifier for the handheld computer "H" and the value of its sync counter "43" at the time of the modification. It is appreciated that the present embodiment is well suited to include an identifier and sync counter value with previous pedigree information of a data atom, record, or data object in a wide variety of ways. For example, the present embodiment may append, prepend and/or utilize mathematical combinations in order to include an identifier and sync counter value with previous pedigree information of a data atom.

It should be appreciated that it is possible, in some systems perhaps common, that two data atoms that are unordered because they separately mutated from a common ancestor, can mutate to become equal in content. For example, someone's phone number changes and is updated in two separate mode locations which are later synced. In this case, there is no disparity but the data atoms have a different pedigree. The present embodiment allows the two data atoms to be merged into a single data atom with merged pedigree. This merged atom then has priority over the ancestors of either original data atom.

Within the present embodiment, an external agent or process that seeks to resolve conflicts may do so by means of convergent mutations. For example, if an address book entry has two mutations, one with a changed phone extension and one with a changed email, an intelligent agent might choose to resolve the conflict by producing a blended address book entry that includes both the changed phone extension and the changed email. The desired goal is for the blended entry to have priority over both original mutations. Therefore, both items mutate into a new blended content that includes the combined pedigree resulting in a convergent mutation.

FIGS. 2, 3, 4 and 5 each include flowcharts 200, 300, 400 and 500, respectively, of steps performed in accordance with embodiments of the present invention. Flowcharts 200, 300, 400 and 500 each includes processes of the present invention which, in one embodiment, are carried out by a processor(s) and electrical components under the control of computer readable and computer executable instructions. The computer readable and computer executable instructions may reside, for example, in data storage features such as computer usable volatile memory 104, computer usable non-volatile memory 106 and/or computer usable mass data storage device. However, the computer readable and computer executable instructions may reside in any type of computer readable medium. Although specific steps are disclosed in flowcharts 200, 300, 400 and 500, such steps are exemplary. That is, the present invention is well suited to performing various other steps or variations of the steps recited in FIGS. 2, 3, 4 and 5. It should be appreciated that the steps of flowcharts 200, 300,400 and 500 may each be performed by software, by hardware or by any combination of software and hardware.

Figure 2:
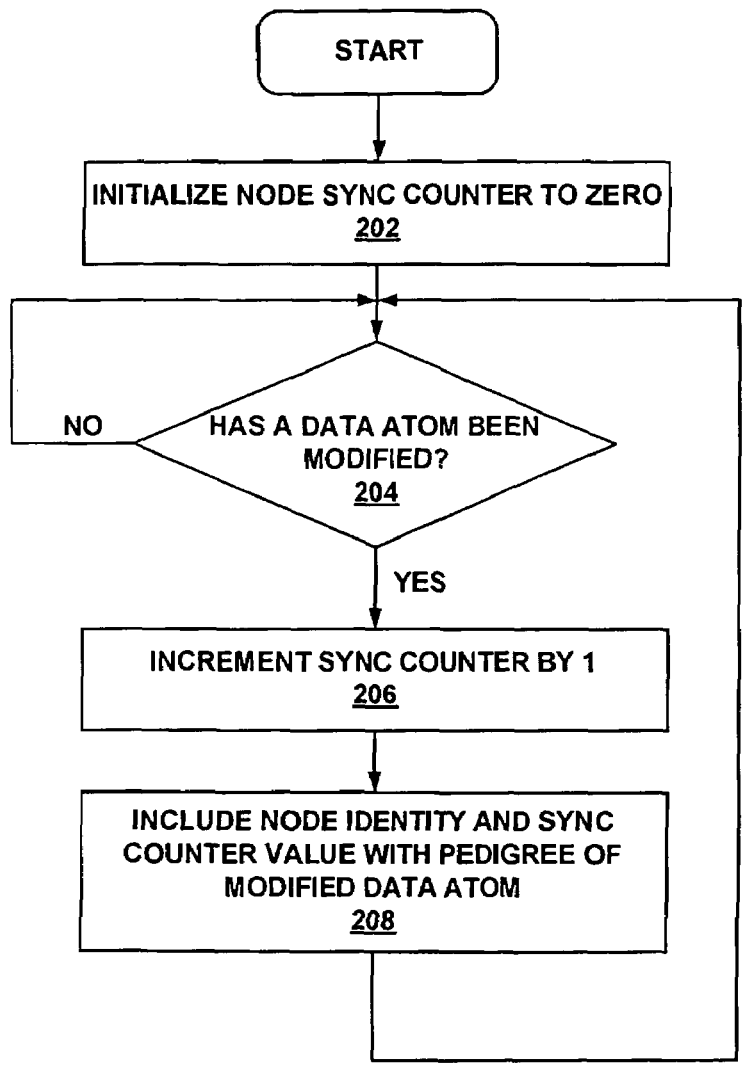
FIG. 2 is a flowchart containing steps performed in accordance with an embodiment of the present invention for utilizing a synchronization counter (or sync clock) and a pedigree of a data atom.

FIG. 2 includes flowchart 200 containing steps performed in accordance with an embodiment of the present invention for utilizing a synchronization counter (or sync clock) and a pedigree of a data atom. Specifically, when a data atom at a data node mutates it is marked with the current node identity and value of that node's sync counter. This marking does not replace the markings from any different sync counter, but it may replace any older marking from the current sync counter. The pedigree of a data atom may then be coded as all of the different nodes at which it has mutated along with the counter value of its most recent mutation at that node.

Additionally, marking a data atom with a sync counter asserts deliberateness. It states that a user or other external agent mutated a data atom with an expectation (fidelity) that the mutation would be preserved over any previous value that data atom had at that node. A system for detecting and resolving disparities within the present embodiment usually depends upon a mark having this type of meaning. It is noted that the pedigree marks should be made when the presumption of deliberateness is valid. The pedigree information of a data atom is the set of sync counter markings attached to it.

At step 202, a sync counter of a node is initialize to a value equal to zero. In step 204, the present embodiment determines whether a data atom has been modified within the node. If the present embodiment determines that a data atom has not been modified within the node at step 204, it proceeds to the beginning of step 204. However, if the present embodiment determines that a data atom has been modified within the node at step 204, it proceeds to step 206.

At step 206 of FIG. 2, the present embodiment advances the node sync counter value by one. It is appreciated that the node sync counter of the present embodiment is advanced with an integer value. However, the present embodiment is well suited to have the node sync counter value advanced in a wide variety of ways. For example, the node sync counter value may be advanced with any type of floating point number or integer number. Alternatively, the node sync counter value may be advanced by sampling a real-time clock value.

Within flowchart 200, the sync counter is advanced when any data atom is modified. However, the present embodiment is well suited for implementations that advance (or increment) less frequently so long as the sync counter is advanced the first time a data atom is modified after a sync. It is understood that the sync counter of flowchart 200 may be advanced (or incremented) in any manner described herein.

In step 208, the present embodiment includes the node's identity and its current sync counter value with the pedigree of the modified data atom. Once step 208 has been completed, the present embodiment proceeds to the beginning of step 204.

Figure 3:
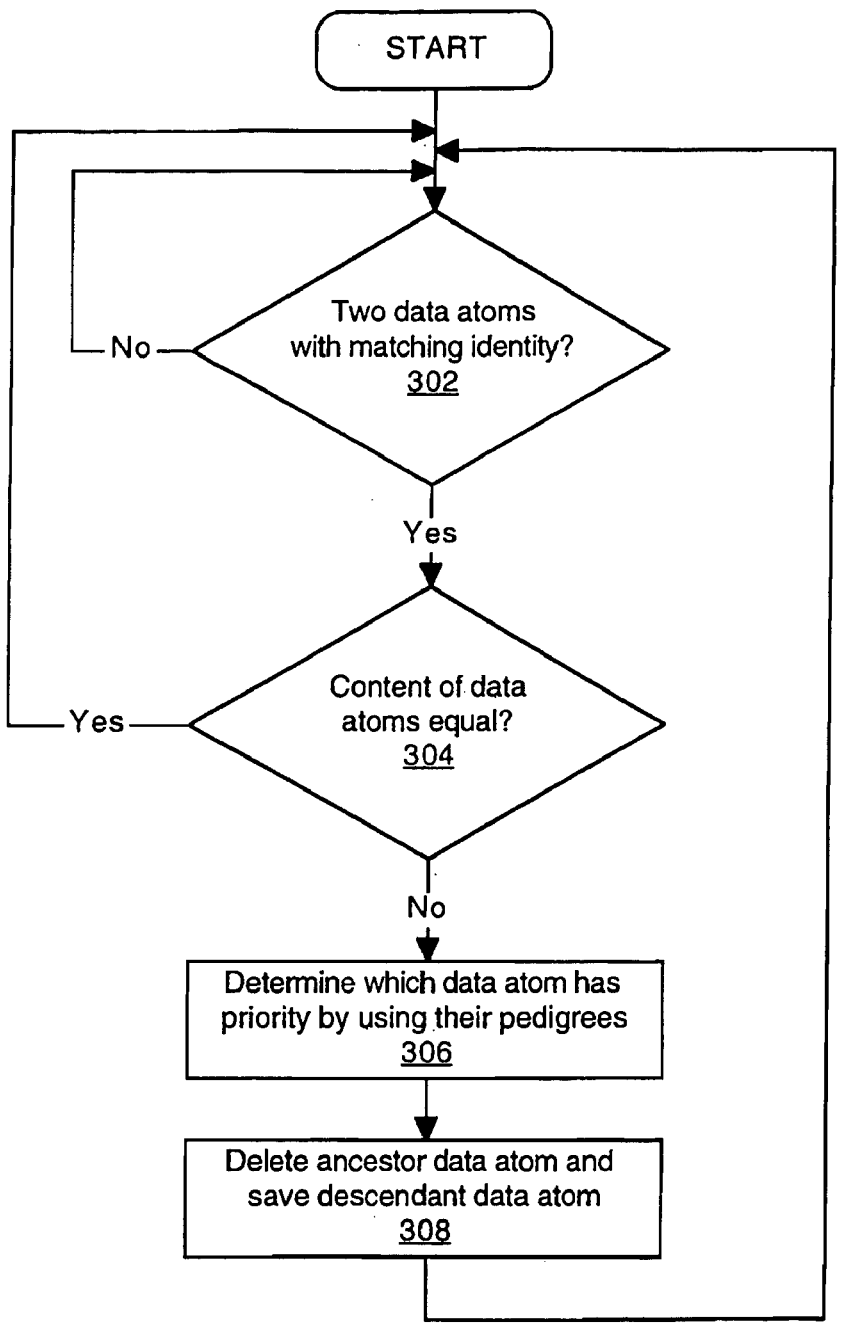
FIG. 3 is a flowchart containing steps performed in accordance with an embodiment of the present invention for enabling determination of priority between two data atoms.

FIG. 3 includes flowchart 300 containing steps performed in accordance with an embodiment of the present invention for enabling determination of priority between two data atoms. Specifically, comparing the sync counter markings for two data atoms is sufficient to determine whether one is descendant from the other. For example, for each sync counter marking attached to an ancestor data atom, a descendant data atom may have the same sync counter with an equal or greater value. In another case (e.g., unordered disparity), a sibling atom may have at least one sync counter marking of lower value and one sync marking of higher value.

In step 302, the present embodiment determines whether the identities of two data atoms match. If the present embodiment determines that the identities of the two data atoms do not match, it proceeds to the beginning of step 302. However, if the present embodiment determines that the identities of the two data atoms do match at step 302, it proceeds to step 304.

At step 304, the present embodiment determines whether the content of the two data atoms are equal. If the present embodiment determines that the content of the two data atoms are equal, it proceeds to the beginning of step 302. However, if the present embodiment determines that the content of the two data atoms are unequal at step 304, it proceeds to step 306.

In step 306 of FIG. 3, the present embodiment determines which data atom has priority by using each of their pedigrees. It is understood that the pedigrees of both data atoms are compared by the present embodiment in order to determine which data atom is the descendant and which one is the ancestor. This determination at step 306 may be done in any manner described herein. Once this is determined, it is appreciated that the descendant data atom takes priority over its ancestor data atom. At step 308, the present embodiment deletes (or disregards) the ancestor data atom and stores (or uses) the descendant data atom for future use. Once step 308 is completed, the present embodiment proceeds to the beginning of step 302.

It is understood that the process of flowchart 300 may occur within a node during (or as part of) a synchronization process between the node and another node. Alternatively, the process of flowchart 300 may occur within a node after a synchronization process between the node and another node.

Figure 4:
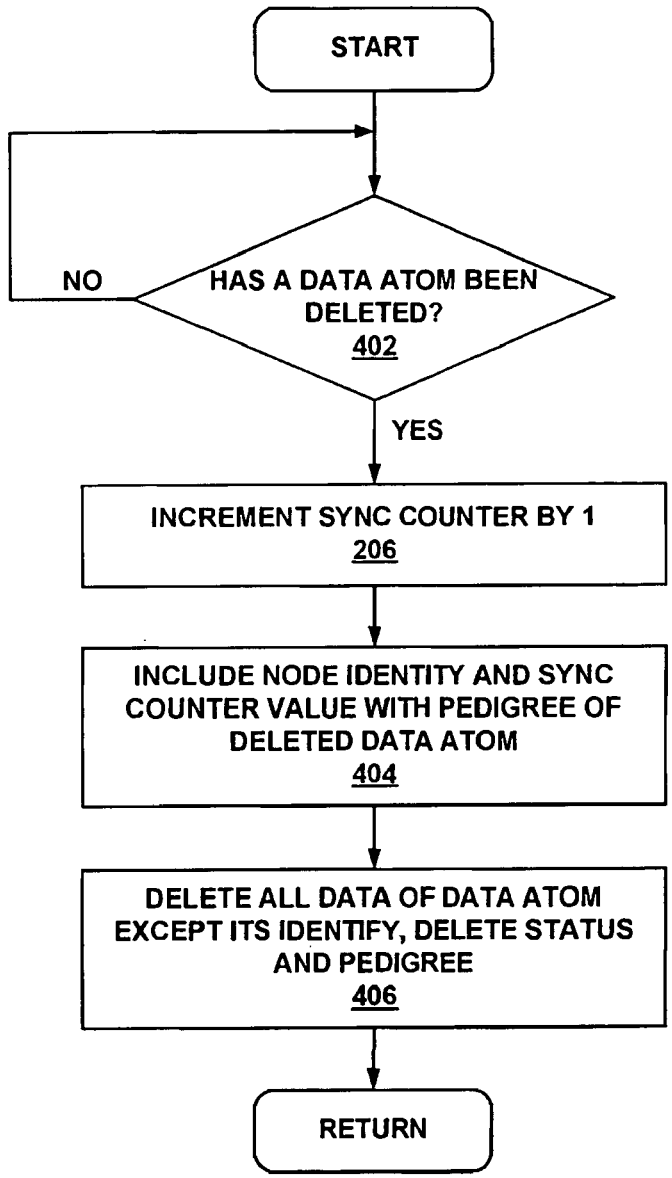
FIG. 4 is a flowchart containing steps performed in accordance with an embodiment of the present invention for handling data atoms that have been deleted by a node.

FIG. 4 includes flowchart 400 containing steps performed in accordance with an embodiment of the present invention for handling data atoms that have been deleted within a node. It should be appreciated that it may become burdensome to a node to maintain complete data atoms of which have been previously deleted within the node. As such, flowchart 400 may be viewed as an optimization process. Specifically, flowchart 400 optimizes storage of deleted data atoms by saving their identity information, deleted status and their pedigrees while deleting any other information associated with them. Therefore, when a sync process occurs with another node, it may also optimize its storage of deleted data atoms.

In step 402, the present embodiment determines whether a data atom has been deleted within a node. If the present embodiment determines that a data atom has not been deleted within the node at step 402, it proceeds to the beginning of step 402. However, if the present embodiment determines that a data atom has been deleted within the node at step 402, it proceeds to step 206. At step 206, as described herein, the present embodiment advances the node sync counter value by one. However, the value of the node sync counter may be advanced (or incremented) in a wide variety of ways in accordance with the present embodiment. For example, the value of the node sync counter may be advanced in any manner described herein.

At step 404 of FIG. 4, the present embodiment includes the node identity and sync counter value with the pedigree of the deleted data atom. In step 406, the present embodiment deletes all of the data associated with the deleted data atom except for its identity, deleted status and its pedigree which all may be referred to as a deleted data atom "stub". In this manner, when a sync process occurs with another node, that node may also optimize its storage by modifying the "deleted" data atom into a deleted data atom "stub". Additionally, this prevents the "deleted" data atom from being re-established within the node that initially deleted it. Once step 406 is completed, the present embodiment exits flowchart 400.

Figure 5:
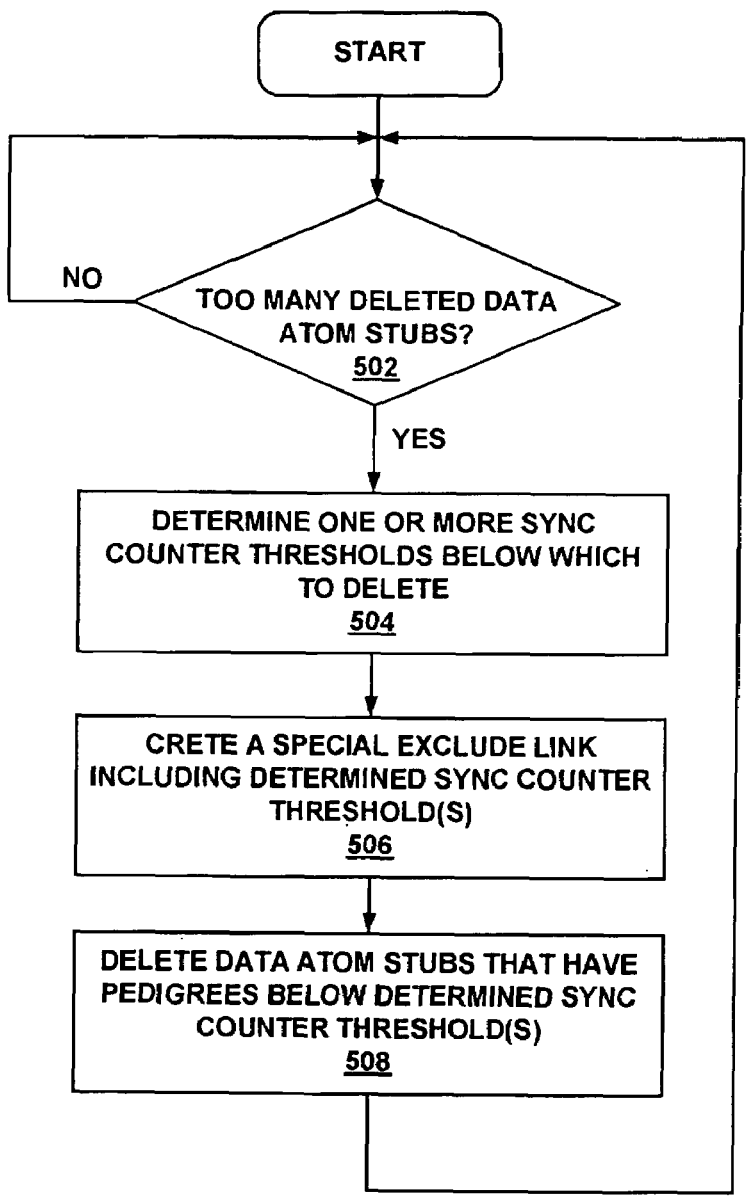
FIG. 5 is a flowchart containing steps performed in accordance with an embodiment of the present invention for enabling a node to manage completely deleted data atoms.

FIG. 5 includes flowchart 500 containing steps performed in accordance with an embodiment of the present invention for enabling a node to manage completely deleted data atoms. Specifically, flowchart 500 enables further optimization by completely removing deleted data atoms from a node by utilizing a determined pedigree of sync counters to designate which data atoms to remove. The pedigree of sync counters is utilized to create a special exclude link which subsequently indicates to one or more nodes which type of data atoms were completely removed.

It is noted that flowchart 500 specifically operates with deleted data atom "stubs" (that include each data atom's identity, delete status and pedigree). However, flowchart 500 is well suited to operate with data atoms that are to be deleted in the same manner it operates with deleted data atom "stubs".

In step 502, the present embodiment determines whether there are too many deleted data atom "stubs" within the node. If the present embodiment determines that there are not too many deleted data atom stubs within the node at step 502, it proceeds to the beginning of step 502. However, if the present embodiment determines that there are too many deleted data atom stubs within the node at step 502, it proceeds to step 504.

At step 504, the present embodiment determines one or more node identities and sync counter thresholds associated with the pedigrees of the deleted data atom stubs. It should be understood that the determined node identity (or identities) and corresponding sync counter threshold(s) will subsequently be used to completely remove one or more deleted data atom stubs from the node. For instance, any deleted data atom stub that has a node identity (or identities) with a sync counter value(s) within their pedigree equal to or less than the determined sync counter threshold(s) associated with the determined node identity (or identities) is completely removed from the node. For example, given that the sync counter of computer "D" and handheld computer "H" are currently equal to "D136" and "H155," respectively, the present embodiment may determine that too much storage space within its node is being used by deleted data atom stubs at or below threshold levels "D34" and "H39." As such, the threshold levels "D34" and "H39" may later be utilized to remove specific deleted data atom stubs from the node.

In step 506, the present embodiment creates a special exclude link which includes the determined node identity (or identities) and sync counter threshold(s) for the deleted data atom stubs. In this manner, when a synchronization occurs between two nodes, the special exclude link of the first node indicates to the other node which deleted data atom stubs were completely removed from the first node. Additionally, the special exclude link may also cause the second node to completely remove those deleted data atoms stubs from itself that correspond to the special exclude link and also cause the creation of its own special exclude link.

At step 508 of FIG. 5, the present embodiment completely removes the deleted data atom stubs that have specific node identities with sync counters within their pedigrees equal to or less than the determined sync counter threshold(s) associated with the determined node identity (or identities). In this manner, memory space within the node may be freed up for different functionality include, but not limited to, storing other active data atoms and their associated pedigrees. Once step 508 is completed, the present embodiment proceeds to the beginning of step 502.

It is appreciated that depending on the implementation of the advancement of node sync counters, the present embodiment of step 508 may be implemented such that it completely removes the deleted data atom stubs that have specific node identities with sync counters within their pedigrees equal to or greater than the determined sync counter threshold(s) associated with the determined node identity (or identities). As such, step 508 may be implemented in a wide variety of different ways in accordance with the present embodiment.

Accordingly, the present invention provides a method and system for enabling a node to more easily determine which version of a record (if any) takes precedence over one or more other versions of the same record.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A computer-usable medium having computer-readable code embodied therein for causing a computing device to perform a method comprising the steps of:

deciding if a data atom has been deleted within said computing device;

incrementing a synchronization counter value of said computing device, provided said data atom has been deleted within said computing device;

including an identity of said computing device and said synchronization counter value with a pedigree of said data atom that has been deleted, after said incrementing;

deleting data associated with said data atom except for said data atom's identity, deleted status and said pedigree;

synchronizing said computing device with a second computing device after said deleting; and modifying a copy of said data atom that was deleted on said second device in response to said synchronizing.

2. The computer-usable medium as described in claim 1 wherein said synchronization counter value of said device is advanced with a floating point number.

3. The computer-usable medium as described in claim 1 wherein said synchronization counter value of said device is advanced with an integer value.

4. The computer-usable medium as described in claim 1 wherein said computing device comprises a handheld computer.

5. The computer-usable medium as described in claim 1 wherein said computing device comprises a portable information device.

6. The computer-usable medium as described in claim 1 wherein said computing device comprises a server.

7. A method of determining priority between data sets within a computing device during synchronization between different endpoints, comprising the steps of:

determining if a data atom has been deleted within the computing device;

incrementing a synchronization counter value of said computing device, provided said data atom has been deleted within said computing device;

including an identity of said computing device and said synchronization counter value with a pedigree of said data atom that has been deleted, after said incrementing step; and deleting data associated with said data atom except for said data atom's identity, deleted status and said pedigree;

synchronization of said device with a second device after said deleting step; and modifying a copy of said data atom that was deleted on said second device in response to said synchronizing.

8. The method as described in claim 1 wherein said computing device comprises a handheld computer.

9. The method as described in claim 1 wherein said computing device comprises a computer system.

10. The method as described in claim 1 wherein said computing device comprises a server.

11. The method as described in claim 10 wherein said synchronization counter value of said device is advanced with a floating point number.

12. The method as described in claim 10 wherein said synchronization counter value of said device is advanced with an integer value.

13. The method as described in claim 1 wherein said computing device comprises a portable information device.

14. A method of determining priority between data sets in a computing device during synchronization with a second device, comprising the steps of:

determining whether there are too many data atom stubs within a device, wherein a deleted data atom stub includes a data atom's identity, deleted status and pedigree;

determining a device identity and synchronization counter threshold associated with a pedigree of a deleted data atom stub of said data atom stubs, provided there are too many data atom stubs within said device;

creating an exclude link comprising said determined device identity and said determined synchronization counter threshold; and removing said data atom stub from said device having a pedigree comprising said determined device identity and satisfying said determined synchronization counter threshold;

synchronizing comprises said exclude link indicating to said second device that said deleted data atom stub was removed from said device; and exclude link causing said second device to create an exclude link for said second device.

15. The method as described in claim 14 wherein said exclude link causing said second device to remove a copy of said deleted data atom stub from said second device that corresponds to said exclude link.

16. The method as described in claim 14 wherein said pedigree of said deleted data atom stub comprises a synchronization counter value associated with said determined device identity that is equal to or less than said determined synchronization counter threshold.

17. The method as described in claim 14 wherein said pedigree of said deleted data atom stub comprises a synchronization counter value associated with said determined device identity that is equal to or greater than said determined synchronization counter threshold.

18. The method as described in claim 14 wherein said device comprises a computer system.

19. The method as described in claim 14 wherein said device comprises a handheld computer.

20. The method as described in claim 14 wherein said device comprises a server.

* * * * *